May 22, 1962 C. R. KEMP ETAL 3,036,229
WELL TEST PROGRAMMING SYSTEM AND PROGRAMMER THEREFOR
Filed Dec. 24, 1959 3 Sheets-Sheet 1

Charles R. Kemp
Earle F. Holmes
INVENTORS

BY Browning, Simms, Hyer
& Eickenroht
ATTORNEYS

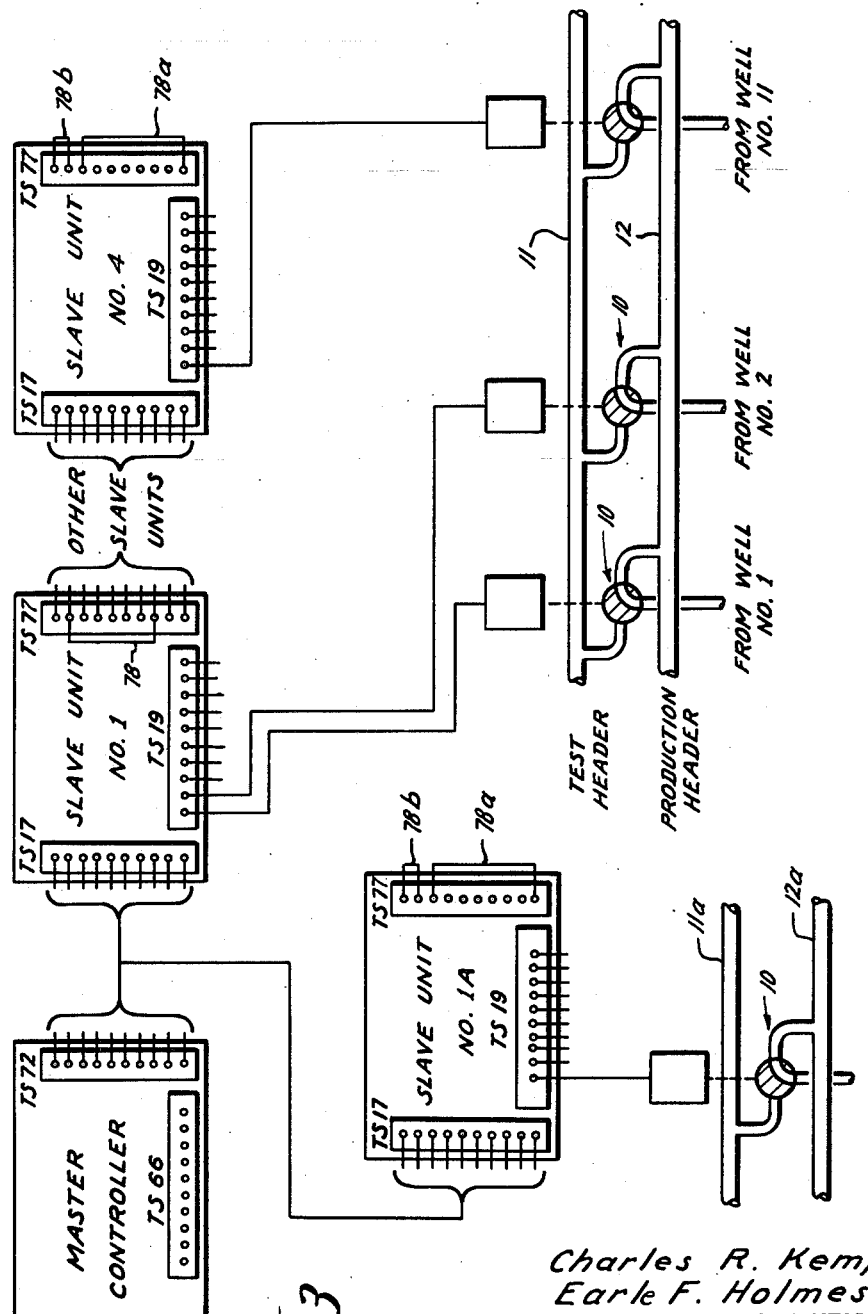

United States Patent Office 3,036,229
Patented May 22, 1962

3,036,229
WELL TEST PROGRAMMING SYSTEM AND PROGRAMMER THEREFOR
Charles R. Kemp and Earle F. Holmes, Longview, Tex., assignors to U.S. Industries, Inc., a corporation of Delaware
Filed Dec. 24, 1959, Ser. No. 861,988
14 Claims. (Cl. 307—115)

This invention relates to improvements in programming systems for wells and in one of its aspects, it relates to an improved programmer for testing wells.

In the production of petroleum from wells, it is usually desirable to periodically test the wells to determine one or more characteristics of their production. For example, each individual well may be tested to determine its gas-oil ratio, the amount of water being produced, the gravity of the oil, rate of production, etc.

Normally all of the wells producing from a single horizon on a lease have their production commingled in a common header after which it can be passed to the usual separator, treating facilities, storage, etc. To test individual characteristics of each well's production, it is therefore necessary that each well separately and individually be turned into a test system in which the desired variables can be measured. Normally, the wells of a lease or leases will be individually tested by turning them into the test system in some predetermined sequence and for a predetermined time. The sequence of testing and timing can be termed well test programming.

Since there is a wide variation in the characteristics of wells and oilfield leases as to their testing requirements, automatic well test programming systems in the past have been largely specially designed and constructed to fit the individual requirements of each installation. This has resulted in costly systems which had little flexibility. For example, it has not been possible to install a relatively inexpensive system for a limited number of wells and then to expand this system to accommodate additional wells without substantially duplicating the original system thereby excessively multiplying the cost of the total installation.

It is accordingly an object of this invention to provide an improved well test programming system which involves a single set of standardized components of sufficiently flexible design that they can meet widely varying test requirements and can be readily expanded to accommodate an almost unlimited number of wells.

Another object of the invention is to provide such a programming system which can be of modular construction comprising a master control module or unit and one or more slave modules, the system being such that additional slave modules can be added at any time to expand the programming system to test an almost unlimited number of wells.

Another object is to provide such a programming system in which the slave modules can be added in series so that the added wells are tested in sequence with the original wells, or in parallel so that the wells of two or more groups of wells can be simultaneously tested, all under the control of a single master controller.

Another object is to provide a programmer in which the sending of several required signals at predetermined intervals from the master controller is controlled by a cam timer to afford a very flexible and yet economical construction.

Another object is to provide an improved automatic well test programmer which incorporates a manual test circuit permitting the manual testing of any well connected to the controller at any desired time without disrupting the automatic test sequence except to delay it for the period of time selected for the manual test.

Other objects, advantages and features of this invention will be apparent to one skilled in the art upon a consideration of the specification, the claims and the drawings wherein:

FIG. 3 is a schematic diagram illustrating the mode of connection of a master controller to the various ones of slave units, both in series and in series-parallel and further illustrates the connection of the slave units to manifolding valves for testing of a series of wells.

Figure 1:
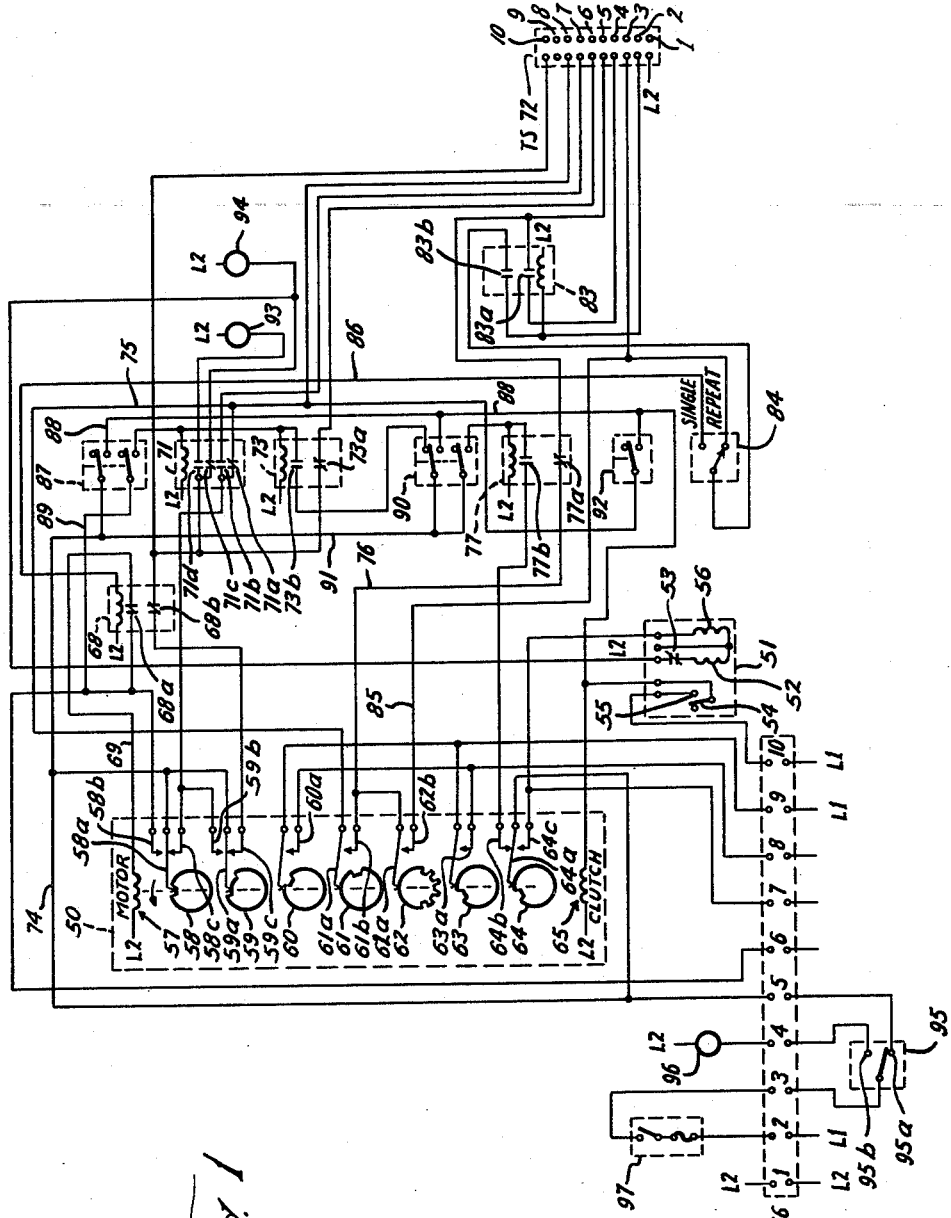
FIG. 1 is a schematic wiring diagram illustrating a preferred form of the master controller of this invention.

Like numerals will be used throughout the several views to designate like parts. For the sake of convenience therein the terminal strips shown in the drawings will be designated by the letters TS followed by two numerals, the first of which will identify the terminal strip and the second the specific terminal on such strip. For example, TS 3–7 would identify terminal strip number 3, 7 terminal. Likewise, certain switches connected in parallel will be designated by two numbers, the first identifying the entire group of switches and the second the individual switch of that group. Also for the sake of simplicity, only one wire (L1) of a two wire 110 volt A.C. system has been shown. The return wire (L2) is not shown but it will be understood that all points labelled L2 in the drawings will be connected to TS 66–1.

Perhaps the description of the invention can best proceed by first describing a slave unit or module and then describing the master controller. Thus, referring to FIG. 2, in which a typical slave module is illustrated, a plurality of two-way valves 10 are each connected to a well and to test and production headers 11 and 12. The valves 10 are electrically controlled in the sense that solenoid valves and relays 13 control the application of pneumatic pressure to the diaphragms of valves 10 to position the latter in one of three positions: (1) in a center position in which the well is closed in, (2) in a position to divert the flow of the well into the production header while preventing it from flowing into the test header and (3) in another position to divert flow from the well into the test header and prevent flow into the production header. If desired, two position valves can be used which will turn the well into one of the headers but which will not shut the well in. While only a few of the control valves 10 have been shown, it will be understood that one is supplied for each well and that during normal operation of the testing system, only one well at any one time will be turned into the test header while one or more of the remaining are turned into the production header.

A step switching means is provided for sequentially connecting a power source to the individual electrically controlled valves so as to cause them to divert production of the well into the test header and then back into the production header. Thus a stepping switch 14 can have its input 15 connected to a power source (described below) via wire 16 which is connected to TS 17–6. The stepping switch has a plurality of terminals 18 which are respectively connected, via TS 19, to the individual solenoids on the valves 10. Thus it will be seen that as the stepping switch is stepped from contact to contact, it will sequentially apply power to the solenoids of the well control valves to cause them to open successive wells into the test header.

Figure 2:
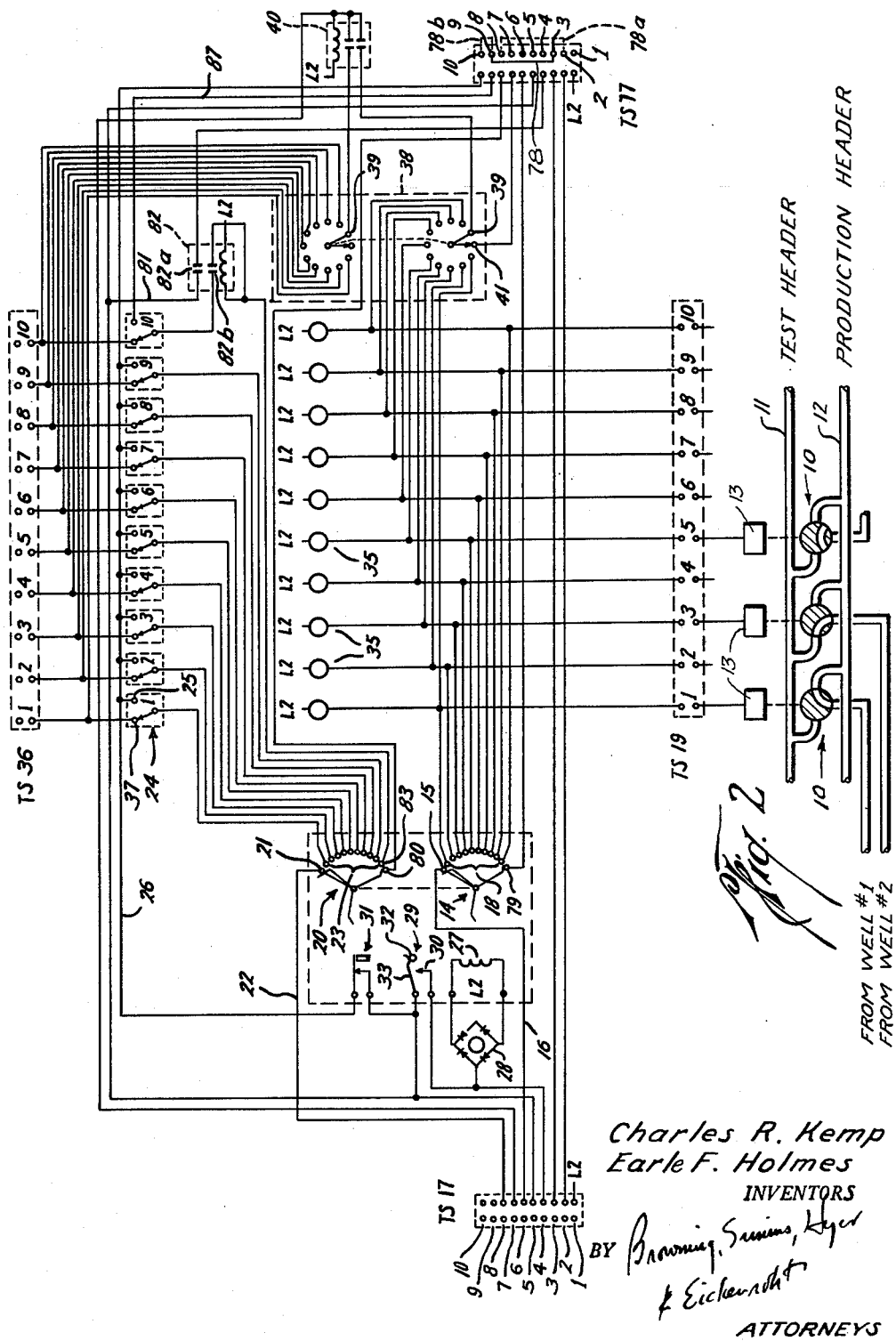
FIG. 2 is a similar diagram illustrating a slave unit.

Means are provided for selecting those wells connected to the slave unit which are to be tested and for skipping the other wells so connected which are not to be tested. Such a means can comprise a stepping switch 20 having its input 21 connected to a power source via wire 22 and TS 17–8. Stepping switches 14 and 20 are preferably arranged so that they step in unison and switch 20 has a plurality of points 23 corresponding in number and position to points 18 of switch 14. The points 23 are individually connected to selector switches 24. Each of these switches has a contact 25 connected to a wire 26 which in turn is connected to a power responsive actuating mechanism which causes the stepping switches 14 and 20 to step. This actuating mechanism can include a coil 27 which when energized causes the contactors of the stepping switches to be rotated. The coil is powered, as shown, by direct current which is derived by a suitable rectifier 28 connected to a power source via TS 17–4. The rectifier is also connected to a switch 29 which has its contactor connected in series with a self-interrupter switch 31, the latter in turn being connected to wire 26. Switch 29 is normally closed on contact 30 when the stepping switches are other than in home position as shown in FIG. 2. When the stepping switches are in home position, cam 32, which is driven by the stepping switch mechanism, lifts contact 33 to open switch 29. The self-interrupter switch 31 is a normally closed switch which, upon receiving a signal sufficient to cause the stepping switches to advance one position, automatically opens itself until such signal is removed. The stepping switches, coil, and switches 29 and 31 are available as a commercial unit known as the Automatic Electric Type 44 Stepping Switch and for this reason this unit has been shown enclosed in a dashed outline.

With the foregoing construction, it will be seen that when power is applied to coil 27, it will cause stepping switches 14 and 20 to step to their next position. If the selector switch 24 connected to that position of stepping switch 20 is closed to its contact 25, current will flow from input 21, through the corresponding one of selector switches 24 and then back through switches 31 and 29 to apply a signal to coil 27 to cause the stepping switches to advance another position. Thus it is possible by closing any one of switches 24 onto their contacts 25 to cause a well to be skipped and not tested. In fact, all of the switches 24 of a slave unit can be closed so that the well testing sequence passes to the next slave unit as will be described below.

Signal lights 35 can be connected in parallel to the electrically controlled valves so that a corresponding one of them lights up as a particular well is placed on test.

The slave unit can also be provided with a terminal strip TS 36, the individual terminals of which are connected to the other contacts 37 of switches 24. Thus, it will be seen that when a particular well is on test, power will be supplied to the corresponding terminal of TS 36. This power can be utilized for various purposes such as for actuating a sampling mechanism which takes samples from the test header, operating routing valves which can route the fluid in the test header to any one of several devices depending upon which well was being produced. For example, one well may require that its production go to a clean oil separator while another to a dirty oil separator, and still a third to a gun barrel for chemical treatment. TS 36 can also be connected to suitable recording equipment so that the latter can identify the well being tested.

The well test system of this invention also includes provisions for permitting the manual testing of a well. Thus should an operator decide that a particular well needs testing at a particular time, means are provided by which he can interrupt the automatic test sequence and place a selected well on manual test for a desired time. As shown in FIG. 2, such means include a two-deck rotary switch 38. Each deck has its common 39 connected via a relay 40 and TS 17–7 to a power source described below. Thus with power cut off from stepping switches 14 and 20 and applied via TS 17–7, relay 40 will be actuated to close its contacts thereby applying power to the upper and lower decks of rotary switch 38. Each of these decks contain a number of contact points corresponding to the number of wells served by the slave unit and in addition the lower deck has an off-point 41. Thus by turning the switches, the well to be manually tested can be selected and power will be applied through the appropriate contact point of the lower deck to a corresponding one of the terminals of TS 19 to cause the selected well to turn its production into the test header. Simultaneously, the upper deck will apply power to the corresponding terminal of TS 36 so that the external functions governed by power applied to TS 36 occur during the manual testing.

Referring now to FIG. 1 which illustrates a preferred embodiment of the master controller, the timing and the sequence of the events occurring in the slave unit, as well as certain other event, is under the control of a timing and switch means. This is here illustrated as a combination of a single cycle cam timer 50 and a lapsed time reset timer 51 which can be called a "test timer." The latter includes a timing motor 52 which, when it times out, opens contacts 53 and closes contact 54 with contact 55. The closure of these contacts permits the sending of a signal to indicate the lapse of the predetermined time. The timer is also provided with a reset clutch 56 which, upon being energized, causes the timer to be reset to begin another predetermined time interval. Such resetting automatically closes contacts 53 and opens contact 54 and 55. While various timers can be used, one of the foregoing description is known as an ATC Reset Timer, Model No. 2871R.

The single cycle cam timer 50, which can be called an "end of test timer," has a motor 57 which when energized will cause cams 58 through 64 to turn one revolution. The arrangement is such that upon initial energization of clutch 65 the cams are turned a slight amount by a mechanical arrangement, such as a spring, so that follower 58a is lifted from the notch in cam 58 and makes contact with contact 58b. Since the follower 58a is connected to a power source via TS 66–5, current will flow to contact 58b, and then through closed contacts 68a of relay 68 and wire 69 to the motor to energize the same. Of course, as soon as the cams complete one revolution, follower 58a will break the contact and stop the motor.

Prior to actuation of the end of test timer 50, follower 58a will be closed on contact 58c so that current can flow through closed contacts 71a of relay 71 to TS 72–8 and thence to the input 21 of stepping switch 20. In this manner, switch 20 is connected to a power source.

During the test period, follower 59a is closed on contact 59c to apply power to the input of stepping switch 14 via contact 68b of relay 68, contacts 73a of relay 73 and TS 72–6 which is connected to TS 17–6. In this fashion, power can be applied to the well test valve 10 and upon actuation of the end of test timer, follower 59a will break contact with point 59c thereby removing power from the well test valve. At the same time, the follower is elevated by cam 59 to contact with point 59b to apply power, during the remainder of the end of test cycle, to stepping switch 20 so that the latter can cause both itself and stepping switch 14 to be stepped so as to skip any wells which have been turned out of the test sequence.

As indicated above, it is contemplated that recorders or other data storage systems will be used to record or accumulate the well test data including such items as well number, date, time of beginning and ending of test, barrels of oil, volume of gas, etc. In order that these recorders can print out the data and identify when a well is turned on and turned off test, the end of test timer provides signals at the beginning and end of the test. Where the recorder identifies beginning and end of test by a signal sequence, cams 60 and 63 can be provided so that their respective followers close with contacts 60a and 63a respectively, near the beginning and end of the end of test cycle. Thus at the end of the test, cam 60 will cause a signal to be applied from the source TS 66–9 to TS 66–8 which can be connected to the recorder.

Similarly, near the end of the end of test cycle, cam 63 will cause another pulse to be applied to TS 66–8. Where the recorder may require the beginning and end of test signals to be in separate circuits, it can be connected to TS 66–6 and TS 66–7. Thus cam 58 will cause follower 58a to close with contact 58b, thereby applying an end of test signal to TS 66–6 during substantially all of the cycle of the end of test timer. Cam 64, on the other hand, will apply a beginning of test signal to TS 66–7 by closing its follower 64a with contact 64c thereby closing the circuit to the power source at TS 66–2. At this point, it should be noted that closing with contact 64c connects reset clutch 56 to the power source, thereby resetting the timer 51 which when reset, closes contacts 53 and causes contact 54 to open from contact 55, thereby deactivating the end of test timer and starting a new test.

The end of test timer also supplies a pulse to the stepping switches of the slave units to cause them to step to their next position after completion of the well test. Thus cam 61c causes its follower 61a to close with contact 61b after follower 59a has closed with contact 59b. Power is therefore applied from wire 74 via contact 59b through relay 71 to wire 75 which is connected to the follower 61a of cam 61. The power thus applied is connected via wire 76, closed contacts 77a of relay 77, TS 72–5 and TS 17–5 to switch 29. When stepping switches 14 and 20 are in a position other than that shown in FIG. 2, switch 29 will be closed so that the pulse is applied to coil 27 to cause the switches to step to their next position. If the corresponding one of selector switches 24 is closed to "skip" position, power will be applied through such switch to self-interrupter switch 31 and switch 29 to coil 27 to cause the stepping switches to move to their next position and so on until they find a circuit in which the corresponding selector switch 24 is in test position.

Summing up the operation of the apparatus as thus far described, let it be assumed that well No. 1 connected to TS 19–1 is on test, selector switches 24—2 and 24—3 for wells 2 and 3 have been turned to skip position (closed with their contacts 25) and well 4 is the next well to be tested. As soon as the preset time for testing well No. 1 has elapsed, timer 51 will time out and open contacts 53 and closing contacts 54 and 55 will thereby energize clutch 65 to start the end of test timer cycle. During the first portion of this cycle, the circuit to stepping switch 20 is broken at contact 58c and the circuit to motor 57 is closed at contact 58b by raising of follower 58a. This also sends an end of test signal to TS 66–6 and at about the same time, cam 60 causes contact 60a to be closed to send an end of test signal to TS 66–8. As soon as the recorder has had time to print out its end of test data, which time is provided by the wide notch in cam 59, the latter causes its follower to break contact with 59c and close with 59b, thereby removing power from the circuit to the well test valves and again applying power to stepping switch 20. A further slight rotation brings follower 61a into its notch thereby closing the circuit via TS 72–5 and TS 17–5 to switch 29 and coil 27 thereby causing both stepping switches to advance to their next position. Since this position is the one for testing well No. 2 which has been turned out of the cycle, power will be applied from stepping switch 20 via the selector switch 24—2, switches 31 and 29 to coil 27 to cause the stepping switches to advance to their next position. Since well No. 3 is likewise turned out of the cycle, the same sequence of events again happens causing the stepping switches to advance to the position to test well No. 4. As the end of test timer completes its cycle, end of test signals will be sent by cams 63 and 64 and the latter will also energize clutch 56 to reset timer 51 so that as soon as the cams return to the position shown in FIG. 1, the new test cycle for well No. 4 begins.

As above indicated, a plurality of slave units can be used with a single master control. An exemplary arrangement is shown in FIG. 3 wherein four slaves units are indicated as being hooked in series. They can be so hooked merely by connecting the terminals of TS 77 of one slave unit to the correspondingly numbered terminals of TS 17 of a succeeding slave unit. All of the slave units, except the last one, should have a jumper 78 across terminals 3 and 9 of TS 77. The last slave unit should have jumper 78 removed and replaced by jumpers 78a and 78b between terminals 2 and 8 and terminals 9 and 10, respectively. With four slave units of the construction of FIG. 2 hooked in series, as many as 40 wells can be tested, one at a time, under the control of a single master controller. There is essentially no limit to the number of slave units which can be so hooked in series. As shown in FIG. 3, when it is desired to test two groups of wells at the same time, slave units can be hooked in a parallel arrangement with each of the parallel legs containing one or more slave units in series. Thus slave unit No. 1A is in parallel to slave units Nos. 1 to 4 so that, for example, while slave units Nos. 1 to 4 are testing as many as 40 wells, slave unit No. 1A can be simultaneously testing 10 wells. Of course, additional slave units can be added in series with slave unit No. 1A.

When the system has finished testing the last well of the No. 1 slave unit and the wells in the No. 2 slave unit are to be tested, the end of test timer will cause stepping switches 14 and 20 of the No. 1 unit to be stepped to their homed position as shown in FIG. 2. In this position, inputs 15 and 21 are connected with final contacts 79 and 80 and it will be noted that each of these contacts are connected to TS 77, terminals 6 and 8, respectively. Accordingly, power will be applied to the inputs of the stepping switches 14 and 20 in the No. 2 slave unit. The signal which is applied through TS 17–5 to advance stepping switches 14 and 20 of the No. 1 slave unit to their homed or bypassing position as shown in FIG. 2, is also applied to the stepping switches of the No. 2 unit to advance them to their first position. Since the stepping switches of the No. 2 slave unit have previously been in their bypassing position while the wells of other slave units were being tested, switch 29 of slave unit No. 2 will be open and so a pulse applied to TS 17–5 cannot energize coil 27. Accordingly, TS 17–5 is connected via a wire 81 and normally open contacts 82a of relay 82 to TS 77–4 and hence to the bridge 28 in the No. 2 slave unit. Relay 82 is connected to contact 83 (Well No. 10 position) of stepping switch 20 so that when this stepping switch closes on contact 83, relay 82 will be energized to close its contacts 82a. Then when the master controller sends the pulse to TS 17–5 to step the switches in the No. 1 slave unit, the same pulse will be applied via relay 82 to the bridge 28 in the No. 2 slave unit to thereby step the No. 2 slave unit stepping switches.

When the testing has proceeded to the point that the slave unit in a series has been pulsed by closing of contacts 61a and 61b to place its stepping switches in bypassing position, the stepping switch 20 of the last slave unit will turn current into TS 77–8 of the last slave unit. TS 77–8 is jumpered by jumper 78a to TS 77–2. As a result, current flows from the last slave unit back to TS 72–2 of the master controller and energizes relay 83 causing its points 83a and 83b to close. The current from TS 72–2 then flows through closed points 83b to "cycle selector" switches 84 which if in "repeat" position permits the current to flow through wire 85 to points 62b of the end of test timer. Since at this time the end of test timer has already revolved cam 61 so that it already caused a pulse to be sent to step the stepping switches of the last slave unit to their bypass position, another pulse must be sent to the stepping switches of the No. 1 slave unit to move them from their bypass position to their first position. Since at this time these stepping switches have their switch 29 held in open position, it will be necessary to apply the pulse to step them through TS 17–4. To do this, cam 62 is provided with a notch which permits its follower 62a to close on contact 62b shortly after cam 61 has raised its follower 61a from its contact 61b. With the follower 62a in the notch of cam 62, current can flow through wire 76, relay contacts 77a and 83a to TS 17–4 and then to rectifier 28 and coil 27. This causes the stepping relays in the No. 1 slave unit to be moved to their first position to start repeating the test cycle.

If it is desired that the programmer merely test the series of wells and then stop the testing, switch 84 can be moved to the "single" position. When in this position, current applied to TS 72–2 by the stepping switches of the last slave unit again energizes relay 83 closing points 83a and 83b. The current then flows through relay 83, switch 84 and wire 86 to the coil of relay 68. When this latter coil is energized, contacts 68a and 68b are opened, thereby opening the circuit to the well test valves as well as the circuit to the end of test timer motor 57. This stops the programmer and prevents it from starting a new test sequence.

When the last well connected to any slave unit (except the last slave in a series) is bypassed by turning its selector switch 24—10 to skip position, cam 62 will cause the test sequence to advance to the next slave unit. Thus contact 25 of selector switch 24—10 is connected via wire 87 to TS 77–9. In the first and intermediate slave units, TS 77–9 is jumpered to TS 77–3. Then when the stepping switch 20, of the slave unit having its switch 24—10 closed, advances to close on its contact 83, current will flow through relay 82 and its contacts 82b, switch 24—10, wire 87 to TS 77–9 and TS 77–3. From then it flows to TS 72–3 through wire 85 to contact 62b. Accordingly, as cam 62 rotates, its follower 62a will close on contact 62b to complete the circuit back through wire 76, TS 72–5 and TS 17–5 back to contacts 77a, the stepping switches of the slave unit in question to move these stepping switches to the bypass position. At the same time current flows from TS 17–5 via wire 81, closed contacts 82a and TS 77–4 to the stepping switches of the succeeding slave unit to step them to their first position.

It will be noted that cam 62 is provided with a plurality of succeeding notches. The purpose of the extra notches is to advance the test sequence from slave to slave when all of the wells of one or more slave units are being bypassed. For example, assume that only the first well connected to the No. 1 slave unit is to be tested and the other 39 wells which may be connected to the four slave units of FIG. 3 are to be bypassed. Then when the end of test timer sends a pulse in normal fashion to move the No. 1 slave unit's stepping switches 14 and 20 from the No. 1 well position, the switches will automatically be stepped to their tenth well position by current flowing through successive ones of selector switches 24 to advance the stepping switches. Upon stepping switch 20 of the No. 1 slave unit closing on its contact 83, current is sent back through contacts 82b, switch 24—10, TS 77–9, jumper 78, TS 77–3, TS 72–3 and wire 85 to contact point 62b. When cam 62 turns to close its follower on this contact, current will then flow via wire 76, contacts 77a and TS 17–5 to move the No. 1 slave unit stepping switches 14 and 20 to their bypass position and at the same time current will flow via wire 81 to TS 77–4 to move the No. 2 slave unit stepping switches to their first position. Since the selector switches 24 of the No. 2 slave unit have all been set to bypass, the No. 2 slave unit stepping switches will step around automatically until they close on their contacts 83. This again energizes contact 62b so that when the follower 62a falls in the second notch of cam 62, a pulse will be sent out to TS 17–5 of the No. 1 slave unit, and then to TS 77–5 of that same slave unit to TS 17–5 of the No. 2 slave unit causing the stepping switches of the No. 2 slave unit to move to bypass position. This same pulse flows via relay 82 of the No. 2 slave unit to TS 77–4 of that unit and from there to the bridge 28 of the No. 3 slave unit causing its stepping switches to move to their first position. Here again the process is repeated because all wells of the No. 3 slave unit have been bypassed. The same procedure is used to switch the No. 4 unit and after stepping switches have scanned all of the bypassed wells, and closed on their contact 83, current will again flow through the No. 4 unit's relay 82 to TS 77–9. This last TS 77–9 is jumpered to TS 77–10 by jumper 78b whereby current is caused to flow back to the stepping switches of the No. 4 unit to move them to bypass position. As above explained, when the last unit stepping switches are in bypass position, current flows via jumper 78a from TS 77–8 to TS 77–2 of the last unit and then back to TS 72–2 to operate relay 83 and, if switch 84 is set in "repeat" position, to again energize wire 85 so that when cam 62 drops its follower 62a into a notch, a pulse will be set via TS 17–4 to the stepping switches of the No. 1 slave unit to position them in their well No. 1 position.

As above described, rotary switches 38 are connected in parallel with switches 14 and 20 by TS 19 and TS 36 so that a well may be manually tested. To do this, the selector switch 38 is turned until its moving contact is closed with the contact corresponding to the well to be manually tested. Thereafter power is supplied through relay 40 to the rotary switches to effect the testing. In order to supply such power and at the same time interrupt the automatic test sequence, a "start" manual test switch 87 is connected to a power source and via wire 88 to clutch 65 so that when switch 87 is closed, the clutch will be energized to start an end of test cycle. Switch 87 has another pole connected via wire 89 to contact 58b so that when this contact becomes energized during the end of test cycle, relays 71 and 73 will be energized. Energization of relay 71 opens contact 71a and closes contact 71b. Contact 71b is connected to contacts 58c and 59b on one hand to to TS 72–7 and TS 17–7 on the other hand. Therefore, current can be supplied to selector switch 38 to supply power to TS 19 and TS 36. At the same time, opening of contacts 71a and 73a removes power from the stepping switches and hence interrupts power application to the well test valves via the automatic sequence portion of the circuit. The closing of contact 73b connects both relays 71 and 73 to switch 90 and with the switch in the position shown, to the power source via wires 91 and 74. Thus when manual switch 87 is released, relays 71 and 73 will remain energized until switch 90 is operated. The latter switch is the "stop" manual test switch. When it is desired to end the manual test, this switch is depressed which breaks the circuit to relays 73 and 71 permitting them to become de-energized and closes the circuit via wire 88 to the end of test timer clutch, thereby initiating another end of test cycle. At the same time, the closing of the switch energizes relay 77 thereby opening contacts 77a and closing contacts 77b. Closing of the latter connects the relay coil to contact 64b and hence to the power source to maintain relay 77 energized until after cams 61 and 62 have turned their notches past their respective followers after which cam 64 breaks the circuit to relay 77 permitting it to be de-energized. By thus keeping the relay 77 energized during the time when cams 61 and 62 are tending to send signals to advance the stepping switches, contact 77b being open prevents these signals from passing through the stepping switches and therefore when the system is returned to the automatic test sequence, the well which was on test before the manual test started will return to automatic test and will go through an entirely new test period.

Switch 92 is provided as an "auto test interrupter." It is connected between the clutch and contacts 58c so that when the switch is closed, the clutch will be energized to initiate an end of test cycle.

Signal lights 93 (manual test) and 94 (auto test) can be connected to contacts 59c via contacts 71c and 71d so as to be appropriately lighted to signal when a well is being automatically tested or when one is being manually tested.

Another switch 95 can be provided in the power circuit to the master controller and connected to a level sensing device on a separator. When the liquid level in the separator is at normal level, the switch 95 closes the power source through contact 95a into the master controller but when the liquid level departs from normal, the switch opens from contact 95a and closes onto contact 95b to signal via light 96 that the separator level is not normal and the well testing has been temporarily interrupted.

A circuit breaker 97 can be provided if desired.

From the foregoing it will be seen that this invention is one well adapted to attain all of the ends and objects hereinabove set forth, together with other advantages which are obvious and which are inherent to the apparatus and system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for programming the testing of a plurality of wells comprising a master controller and a plurality of separate slave units; each of the slave units having step switching means therein having an input and also having a plurality of first outputs adapted to be respectively connected to a well and actuatable to sequentially switch power from one first output to another, each of the step switching means also having an additional output connected to the input of the step switching means of the next succeeding slave unit so that as one step switching means completes its sequence of switching to apply power to its first outputs, it diverts such power to the input of the succeeding step switching means; the master control unit including a timing and switching means connecting a power source to the input of the step switching means of the first slave unit for a predetermined test time and then interrupting power thereto and during the time such power is so interrupted, applying power to an actuator for the step switching means to cause the same to step; and means preventing a step switching means from being stepped by its actuating means while such step switching means is connecting its input to its additional output.

2. The system of claim 1 in combination with a first circuit connecting the additional output of the step switching means of the last slave unit to the timing and switching means of the master controller, a second circuit connecting the timing and switching means to the actuator for the step switching means of the first slave unit, said timing and switching means being operable, after it has applied power to step the step switching means of the last slave unit to connect its input to its additional output, to connect said first and second circuits to apply power to the actuator for the step switching means of the first slave unit to step such switching means to its first position to start a new test sequence.

3. The system of claim 1 wherein each slave unit is provided with a test selector connected to the step switching means of that slave unit to cause the step switching means to skip the application of power to preselected ones of its first outlets so that preselected first outputs can be skipped in the test sequence.

4. The system of claim 3 wherein said step switching means includes first and second step switches connected so as to step in unison, the first step switch being the one connected to said first outputs, the second step switch having its outputs connected to the actuator for the step switching means, a selector switch in each of the connections between the second step switch and said actuator, and a connection between a power source and the input to the second step switch so that when such switch is stepped to a position wherein its output is connected through a closed one of said selector switches to said actuator, the second step switch will be advanced a step to skip a first output.

5. The system of claim 4 wherein the last one of the selector switches of all slave units, except the last slave unit, are connected, when closed, to the timing and switching means of the master control unit, the latter being operable to connect said last ones of said selector switches to the actuators of the step switches in the slave units so that when the second step switch of a slave unit has been stepped to connect its input to the last selector switch of that slave unit, current will flow through said last switch back to the timing and switching means for the latter to apply to the actuator for said second step switch to step the latter, as well as the corresponding first step switch so that the latter connects its input to its additional output.

6. A system for programming the testing of a plurality of wells comprising a master control unit including a timing and switching means connecting the power source with a first outlet for a predetermined test time and then interrupting power to the first outlet while connecting the power source with a second outlet for a predetermined period and also for a portion of that period connecting the power source with a third outlet and after said period again connecting the source with the first outlet; a slave unit including step switching means connected to the first outlet and to a plurality of first outputs and actuatable to sequentially switch power from one first output to another, power responsive means connected to said third outlet and operable to so actuate said step switching means upon power being applied to the third outlet, and test selector means including a plurality of selector switches connected in parallel to said power responsive means, a second step switching means connecting said second outlet to said selector switches and also being actuatable by said power responsive means so that upon the second step switching means being positioned to connect the second outlet to a closed selector switch, the power responsive means will move both step switching means to a further position.

7. The system of claim 6 wherein as part of said slave unit, each of said step switching means has a final position in which it connects, respectively, the first outlet to a first terminal and the second outlet to the second terminal, the third outlet also being connected to a third terminal; in combination with a second slave unit including third step switching means connected to the first terminal and to a plurality of second outputs adapted to be connected to a second set of wells to selectively open them into a test system, said second stepping switch means being actuatable to sequentially switch power from one second output to another, power responsive means connected to said third terminal and operable to so actuate said third step switching means upon power being applied to the third outlet, and test selector means including a plurality of selector switches connected in parallel to said power responsive means, a fourth step switching means connecting said second terminal to said selector switches and also being actuatable by said power responsive means so that upon the fourth step switching means being positioned to connect the second terminal to a closed selector switch, the power responsive means will move the third and fourth step switching means to a further position.

8. A system for controlling the testing of wells comprising stepping switch means having first and second groups of contact points and a separate contactor for each group of points, the points of the first group being respectively connected to first outputs which are adapted to be respectively connected to valves controlling flow from wells, actuating means for simultaneously moving the contactor for each group of points from point-to-point responsive to application of current thereto; a plurality of selector switches connected between the respective points of the second group and said actuating means so that when a selector switch is closed, current will flow from the contact point of the second group connected thereto the actuating means to cause the contactors to be stepped to their next points respectively; a test timer; an end-of-test timer connected to the test timer to be actuated upon lapse of a predetermined time, the end-of-test timer including normally closed first and second switches respectively connecting the stepping switch means contactors with a current source and normally open third and fourth switches connected so that when closed, the third switch connects the contactor for the second group of contact points to a current source and the fourth switch connects a current source to said actuating means to step the stepping switch means, the end-of-test timer including cam means for actuating said first, second, third and fourth switches to open the first switch while the second is closed to permit time for recording of well data for the well being tested, and then to also open the second switch to interrupt current flow to one of the first outputs and to close the third and fourth switches while the second switch is open so that the stepping switch means be stepped to its next position and should the selector switch for such position be closed, then to another position having the selector switch associated therewith in open position.

9. A well testing control system including a power source; a first stepping switch connecting between the power source and a plurality of first outputs to sequentially apply power to the first outputs; a second stepping switch connected to the power source; stepping means for actuating the stepping switches in unison responsive to application of power to the stepping means; a plurality of selector switches respectively connecting contact points on the second stepping switch to the stepping means so that by closing a selector switch, a corresponding first output connected to the first stepping switch can be skipped; and timing means, including switch means connected in the circuit between the power source and the stepping switches, for sequentially, upon lapse of a predetermined test time, (a) interrupting power application to the first stepping switch to stop application of power to said first outputs while applying power to the second stepping switch, (b) applying power to the stepping means to cause the stepping switches to advance one position and then interrupting such power, (c) continuing to apply power to the second stepping switch so that if the selector switch associated with the new position is closed, the stepping switches will be further advanced and (d) again applying power to the first stepping switch after the second stepping switch has been positioned in a position wherein the associated selector switch is open.

10. A well test programmer comprising a master controller and a plurality of separate slave units; each slave unit including first and second stepping switches, the first stepping switch being connected to a plurality of well test terminals to sequentially apply power to such terminals to actuate well valves which may be connected to the terminals; power responsive stepping means for actuating the stepping switches in unison; a plurality of selector switches respectively connecting contact points on the second stepping switch to the stepping means so that by closing a selector switch a corresponding well test terminal connected to the first stepping switch can be skipped; each stepping switch having a final contact point succeeding the contact points connected to the last well test terminal and the selector switch corresponding to such last outlet; circuits respectively connecting the final contact points of the stepping switches of one slave unit to the input to the stepping switches of a succeeding slave unit whereby upon testing all of the wells connected to one slave unit, the stepping switches of that unit will form a power connection to the succeeding slave unit to test the wells connected thereto; the master controller including a power source, and timing means including switch means connected between the power source and the stepping switches in the first slave unit to sequentially, upon lapse of a predetermined test time, (a) interrupt power to all the first stepping switches, (b) apply power to the stepping means of the stepping switches of the first slave unit whose stepping switches have not closed with their final contact points and then interrupting such power and (c) after the stepping switches have been further advanced by virtue of any succeeding selector switches which may be open, again applying power to the first stepping switches.

11. A system for programming the testing of a plurality of wells comprising a power source; a first stepping switch connecting between the power source and a plurality of well test terminals to sequentially apply power to such terminals; a second stepping switch connected to the power source; power means for actuating the stepping switches in unison; a plurality of selector switches respectively connecting the contact points on the second stepping switch to the power means so that by closing a selector switch a corresponding well terminal can be skipped; a first control switch in the circuit between the power source and the first stepping switch, a second control switch connected between the power source and said power means, a third switch connecting the power source to the second stepping switch, and a single cycle end of test timer including a first, second and third cam driven by a motor, cam followers cooperating with the cams and control switches so that when the cams are in an at-rest position, the first control switch is closed while the second and third control switches are open, the cams being shaped so that upon being rotated by their motor, the first control switch is opened to interrupt power to the valve means and the third switch is closed to apply power to the second stepping switch and thereafter the second switch is closed to apply power to the power means to advance the stepping switches one step, the the third switch thereafter remaining closed so that the stepping switches can be stepped further should appropriate ones of the selector switches be closed.

12. A system for programming the testing of a plurality of wells comprising a plurality of step switching means of the type having an actuator which steps the step switching means one position each time power is applied to the actuator and also having interrupter means preventing the application of power to the actuator when the step switching means is in its last position; a plurality of electrical connections between the step switching means and a plurality of well test terminals to sequentially apply power to the test terminals; a skipping circuit connected to the step switching means to cause the latter to skip preselected ones of said test terminals; said step switching means being connected in series so that when one has stepped through its positions, it will transmit power to the next one; an end of test timer including a plurality of motor driven cams having followers connected to cam switches; a first circuit having a first one of said cam switches therein and connecting a power source to said step switching means to supply power to said test terminals; a second circuit having a second one of said cam switches therein and connecting a power source to said actuator in series with said interrupter means; a third circuit having a third one of said cam switches therein and connecting a power source to said skipping circuit; the cams for said cam switches opening the first cam switch for a portion of the end of test cycle and closing the second cam switch for a portion of the time the first is open and then opening the second cam switch, the cams also closing the third cam switch while the first is open and also for a period after the second cam switch has closed and reopened; a fourth circuit having a fourth cam switch therein and connecting a power source to said actuator in paralell to said interrupter means, the cam for the fourth cam switch closing the same after the second has reopened; and a normally open relay in the fourth circuit, said relay being connected to the last step switching means so as to be closed upon the latter stepping to its last position.

13. The system of claim 12 wherein the end of test timer also includes a cam and switch means connected to send an end of test signal during an initial portion of the end of test cycle and a beginning of test signal at the end of said cycle.

14. The system of claim 12 wherein the skipping circuits include selector switches conected therein so that when the switches are closed, the skipping circuit supplies power to an actuator to cause the step switching means to step to its next position, a return circuit connecting the last selector switch for each step switching means (except the last) to said fourth cam switch as the power source connected thereto and in parallel to said relay.

References Cited in the file of this patent
UNITED STATES PATENTS

| | | |
|---|---|---|
| 2,668,588 | Hamilton | Feb. 9, 1954 |
| 2,736,201 | Ohlsen | Feb. 28, 1956 |